(12) United States Patent
Sales

(10) Patent No.: US 9,867,489 B2
(45) Date of Patent: Jan. 16, 2018

(54) DROP CLOTH RETENTION SYSTEM

(71) Applicant: Bennie Sales, Hampton, VA (US)

(72) Inventor: Bennie Sales, Hampton, VA (US)

( * ) Notice: Subject to any disclaimer, the term of this patent is extended or adjusted under 35 U.S.C. 154(b) by 44 days.

(21) Appl. No.: 15/014,801

(22) Filed: Feb. 3, 2016

(65) Prior Publication Data
US 2017/0215617 A1 Aug. 3, 2017

(51) Int. Cl.
B05B 15/04 (2006.01)
A47G 27/02 (2006.01)
F16B 2/10 (2006.01)
B44D 3/00 (2006.01)

(52) U.S. Cl.
CPC .......... A47G 27/0206 (2013.01); B44D 3/00 (2013.01); F16B 2/10 (2013.01)

(58) Field of Classification Search
CPC ........ Y10T 428/24008; B05B 15/0456; A47G 27/0206
See application file for complete search history.

(56) References Cited

U.S. PATENT DOCUMENTS

| 1,944,610 | A | 1/1934 | Person |
| 3,872,549 | A | 3/1975 | Elyea |
| D338,153 | S | 8/1993 | Hutton et al. |
| 5,529,083 | A | 6/1996 | Martin |
| 7,837,164 | B1 | 11/2010 | Getgood |
| 7,871,052 | B2 | 1/2011 | Baum |
| 2006/0150537 | A1 | 7/2006 | Baum et al. |

FOREIGN PATENT DOCUMENTS

CA         1110585       * 10/1981

* cited by examiner

Primary Examiner — Alexander Thomas

(57) ABSTRACT

A drop cloth retention system includes a drop cloth that may be positioned on a support surface. Thus, the support surface is protected from being contaminated. A clamping unit is provided and the clamping unit may be positioned on the support surface. The clamping engages the drop cloth such that the drop cloth is inhibited from moving on the support surface.

9 Claims, 5 Drawing Sheets

DROP CLOTH RETENTION SYSTEM

BACKGROUND OF THE DISCLOSURE

Field of the Disclosure

The disclosure relates to retention devices and more particularly pertains to a new retention device for retaining a drop cloth on a floor.

SUMMARY OF THE DISCLOSURE

An embodiment of the disclosure meets the needs presented above by generally comprising a drop cloth that may be positioned on a support surface. Thus, the support surface is protected from being contaminated. A clamping unit is provided and the clamping unit may be positioned on the support surface. The clamping engages the drop cloth such that the drop cloth is inhibited from moving on the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
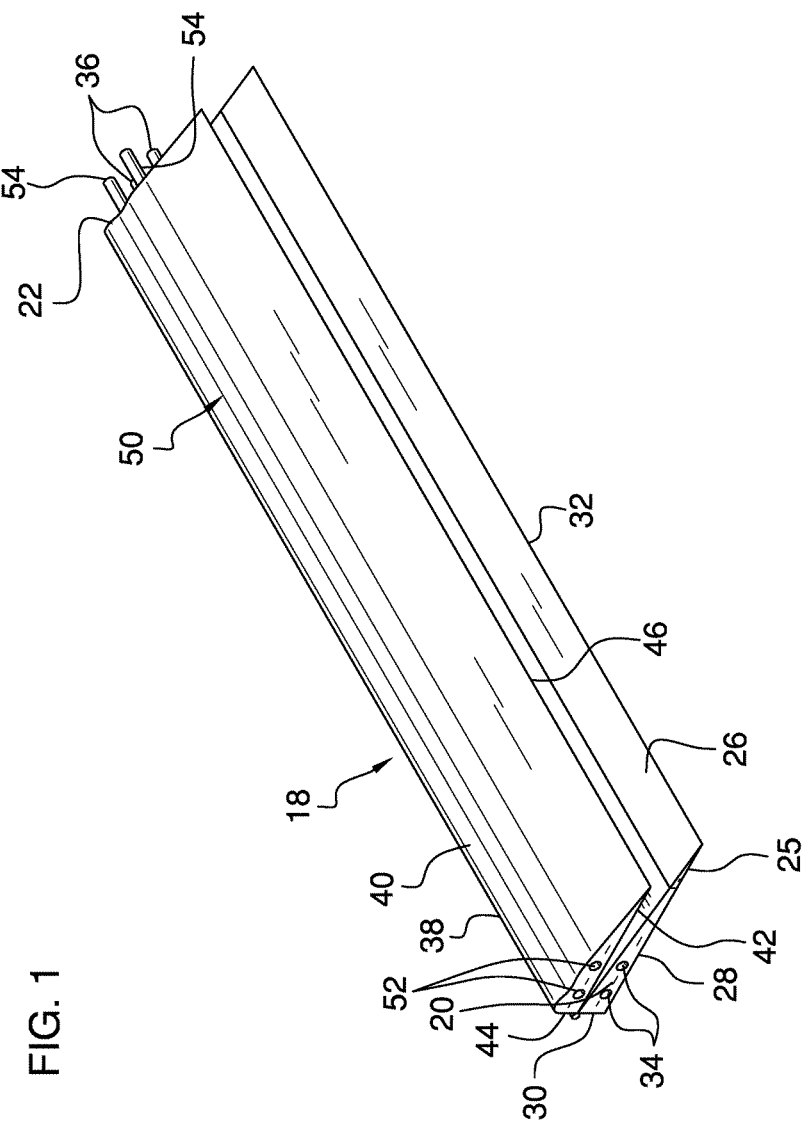
FIG. 1 is a top perspective view of a drop cloth retention system according to an embodiment of the disclosure.
Figure 2:
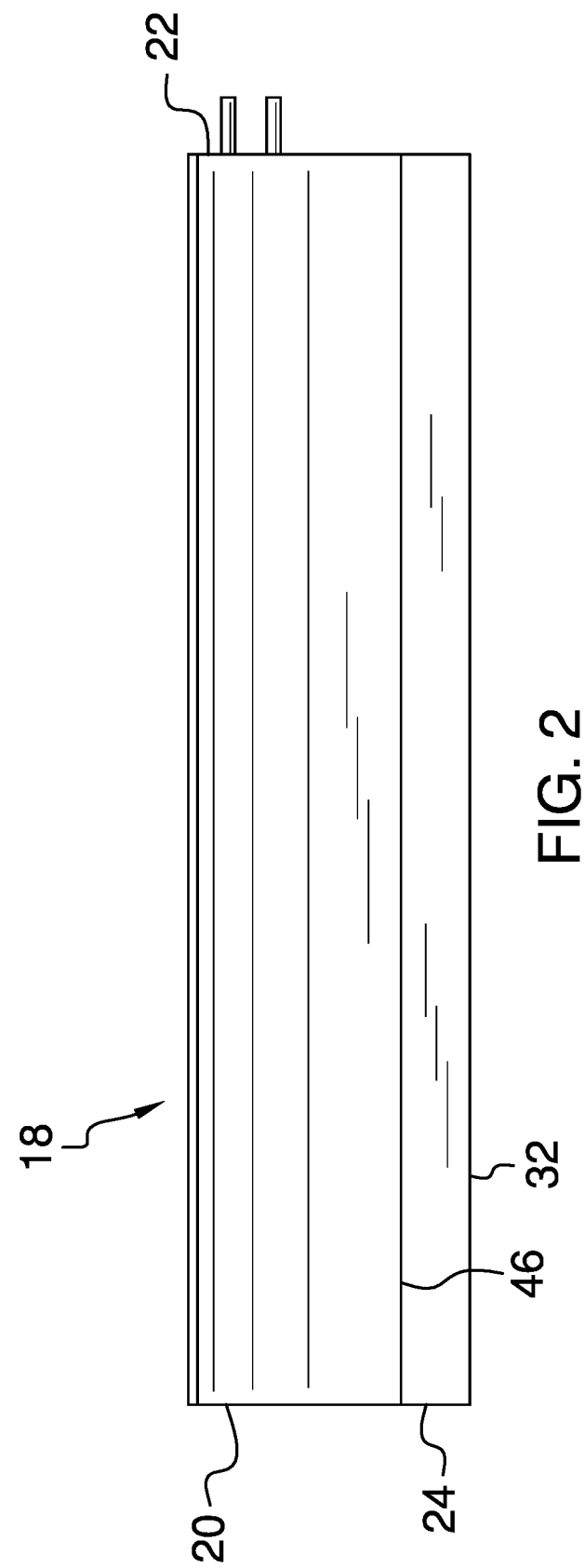
FIG. 2 is a top view of an embodiment of the disclosure.
Figure 3:
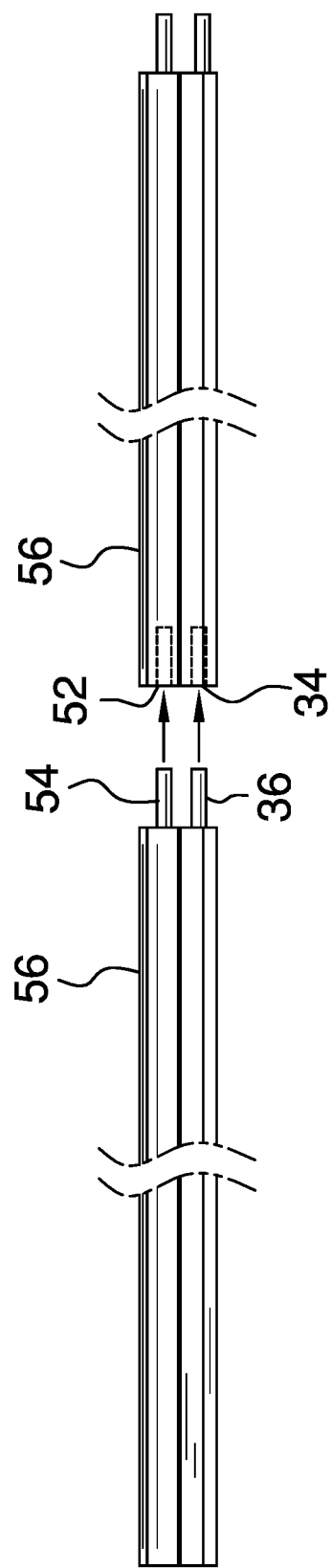
FIG. 3 is a front view of an embodiment of the disclosure.
Figure 4:
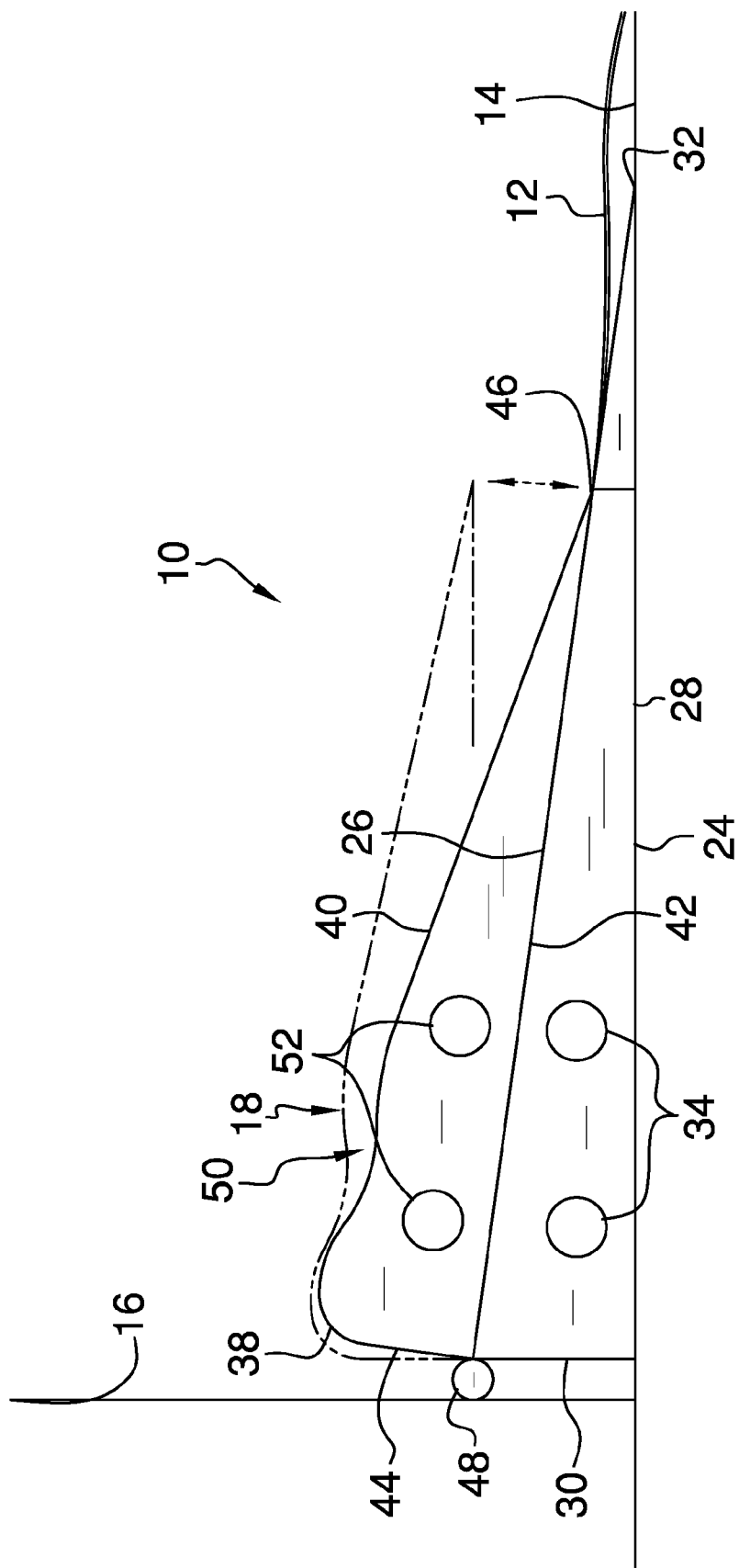
FIG. 4 is a right side view of an embodiment of the disclosure.
Figure 5:
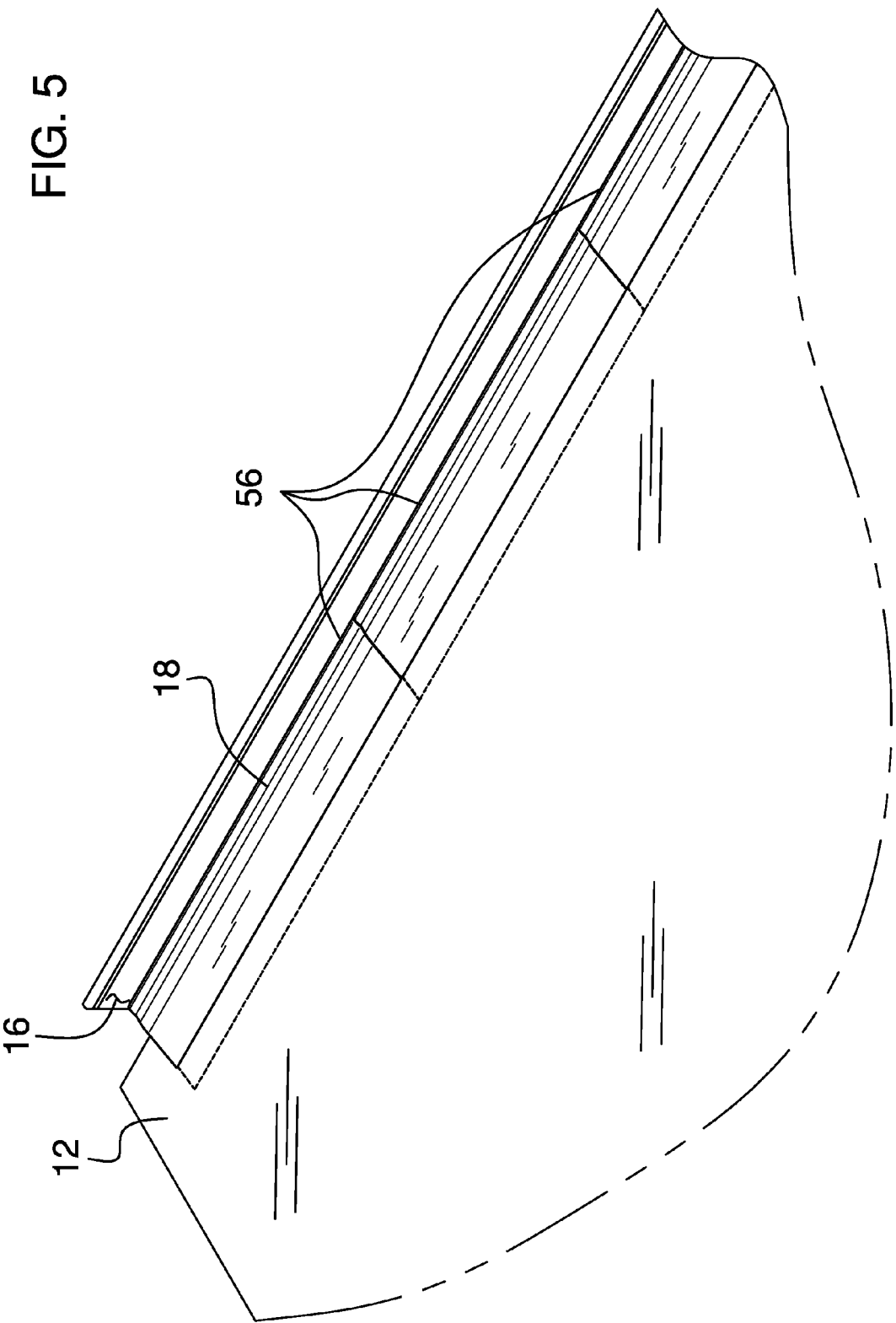
FIG. 5 is a perspective in-use view of an embodiment of the disclosure.

With reference now to the drawings, and in particular to FIGS. 1 through 5 thereof, a new retention device embodying the principles and concepts of an embodiment of the disclosure and generally designated by the reference numeral 10 will be described.

As best illustrated in FIGS. 1 through 5, the drop cloth retention system 10 generally comprises a drop cloth 12 that may be positioned on a horizontal support surface 14. Thus, the drop cloth 12 inhibits the horizontal support surface 14 from being contaminated. The horizontal support surface 14 may comprise a floor or the like. A vertical support surface 16 may intersect the horizontal support surface 14. The vertical support surface 16 may comprise a wall or the like. The drop cloth 12 may be comprised of fabric, plastic or any fluid impermeable material.

A clamping unit 18 is provided and the clamping unit 18 may be positioned on the horizontal support surface 14. The clamping unit 18 engages the drop cloth 12 such that the drop cloth 12 is inhibited from moving on the horizontal support surface 14. The clamping unit 18 has a first end 20 and a second end 22. The clamping unit 18 is elongated between the first end 20 and the second end 22.

The clamping unit 18 comprises a first half 24 that has a top side 26, a bottom side 28 and a back side 30. Each of the top side 26 and the bottom side 28 tapers to a point 32 from the back side 30 such that the first half 24 defines a wedge. The bottom side 28 may be positioned on the horizontal support surface 14. The drop cloth 12 is positioned on the top side 26.

The first end 20 corresponding to the first half 24 has a pair of holes 34 extending inwardly toward the second end 22. The holes 34 are spaced apart from each other. A pair of first pins 36 is provided. Each of the first pins 36 is coupled to and extends away from the second end 22 corresponding to the first half 24.

The clamping unit 18 further includes a second half 38 that has an upper side 40, a lower side 42 and a rear side 44. Each of the upper side 40 and the lower side 42 tapers to a point 46 from the rear side 44 such that the second half 38 defines a wedge. A hinge 48 is coupled between the rear side 44 and the back side 30. Thus, the first half 24 is hingedly coupled to the second half 38. The clamping unit 18 is positionable in an open position having the lower side 42 being spaced from the top side 26. Thus, the drop cloth 12 is positionable between the first half 24 and the second half 38.

The first half 24 has a depth that is greater than a depth of the second half 38. Thus, the point 46 corresponding to the second half 38 is positioned rearwardly with respect to the point 32 corresponding to the first half 24. The point 32 corresponding to the first half 24 is positioned beneath the drop cloth 12. The point 46 corresponding to the second half 38 is positioned on top of the drop cloth 12. The upper side of 40 may have a depression 50 extending between the first end 20 and the second end 22 corresponding to the second half 38. The depression 50 may be positioned proximate the rear side 44.

The clamping unit 18 is positionable in a closed position having the lower side 42 abutting the top side 26. Thus, the drop cloth 12 is compressed between the first half 24 and the second half 38. The hinge 48 biases the clamping unit 18 into the closed position. Thus, the drop cloth 12 is frictionally retained between the first half 24 and the second half 38. The hinge 48 may comprise a spring loaded hinge or the like.

The first end 20 corresponding to the second half 38 has a pair of openings 52 extending toward the second end 22 corresponding to the second half 38. The openings 52 are spaced apart from each other. A pair of second pins 54 is provided. Each of the second pins 54 is coupled to and extends away from the second end 22 corresponding to the second half 38.

The clamping unit 18 is one of a plurality of clamping units 56. Each of the first pins 36 corresponding to one of the clamping units 46 is selectively inserted into the holes 34 corresponding to one of the clamping units 56. Each of the second pins 54 corresponding to one of the clamping units 56 is selectively inserted into the openings 52 corresponding to one of the clamping units 56. Thus, the plurality of clamping units 56 is longitudinally coextensive with each other.

In use, a selected number of the plurality of clamping units 56 is coupled together. The plurality of clamping units 56 is positioned on the horizontal support surface 14. Additionally, the plurality of clamping units 56 is positioned such that the back side 30 and the rear side 44 abut the vertical support surface 16. The plurality of clamping units 18 is manipulated into the open position and the drop cloth 12 is positioned between the first half 24 and the second half 38. The plurality of clamping units 56 is positioned in the closed position. The vertical support surface 16 is painted. The drop cloth 12 inhibits paint from being spilled on the horizontal support surface 14. The plurality of clamping units 56 inhibits the drop cloth 12 from being moved away from the vertical support surface 16.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drop cloth retention system comprising:
   a drop cloth being configured to be positioned on a support surface thereby inhibiting the support surface from being contaminated; and
   a clamping unit being configured to be positioned on the support surface, said clamping unit engaging said drop cloth such that said drop cloth is inhibited from moving on the support surface, said clamping unit including a pair of first pins, a pair of holes, a pair of second pins and a pair of openings; and
   said clamping unit being one of a plurality of clamping units, each of said first pins corresponding to one of said clamping units being selectively inserted into said holes corresponding to one of said clamping units, each of said second pins corresponding to one of said clamping units being selectively inserted into said openings corresponding to one of said clamping units.

2. The system according to claim 1, wherein said clamping unit comprises a first half having a top side, a bottom side, a back side and a front side, each of said top side and said bottom side tapering to a point from said back side such that said first half defines a wedge, said bottom side being configured to be positioned on the support surface, said drop cloth being positioned on said top side.

3. The system according to claim 1, wherein said clamping unit comprises a second half, said second half having an upper side, a lower side and a rear side, each of said upper side and said lower side tapering to a point from said rear side such that said second half defines a wedge.

4. The system according to claim 3, wherein:
   said clamping unit includes a first half, said first half having a back side and a top side; and
   said rear side is hingedly coupled to said back side of said first half, said clamping unit being positionable in an open position having said lower side being spaced from said top side such that said drop cloth is positionable between said first half and said second half, said clamping unit being positionable in a closed position having said lower side abutting said top side such that said drop cloth is compressed between said first half and said second half.

5. The system of claim 1, further comprising:
   said clamping unit having a first end and a second end, said clamping unit being elongated between said first end and said second end, said clamping unit comprising:
   a first half having a top side, a bottom side and a back side, each of said top side and said bottom side tapering to a point from said back side such that said first half defines a wedge, said bottom side being configured to be positioned on the support surface, said drop cloth being positioned on said top side, said first end corresponding to said first half having said pair of holes extending inwardly toward said second end, said holes being spaced apart from each other,
   each of said first pins being coupled to and extending away from said second end corresponding to said first half,
   a second half having an upper side, a lower side and a rear side, each of said upper side and said lower side tapering to a point from said rear side such that said second half defines a wedge, said rear side being hingedly coupled to said back side of said first half, said clamping unit being positionable in an open position having said lower side being spaced from said top side such that said drop cloth is positionable between said first half and said second half, said clamping unit being positionable in a closed position having said lower side abutting said top side such that said drop cloth is compressed between said first half and said second half, said first end corresponding to said second half having said pair of openings extending toward said second end corresponding to said second half, said openings being spaced apart from each other, and
   each of said second pins being coupled to and extending away from said second end corresponding to said second half.

6. A drop cloth retention system comprising:
   a drop cloth being configured to be positioned on a support surface thereby inhibiting the support surface from being contaminated; and
   a clamping unit being configured to be positioned on the support surface, said clamping unit engaging said drop cloth such that said drop cloth is inhibited from moving on the support surface, said clamping unit comprising a first half having a top side, a bottom side, a back side and a front side, each of said top side and said bottom side tapering to a point from said back side such that said first half defines a wedge, said bottom side being configured to be positioned on the support surface, said drop cloth being positioned on said top side; and
   a first end corresponding to said first half has a pair of holes extending inwardly toward a second end, said holes being spaced apart from each other.

7. The system according to claim 6, further comprising a pair of first pins, each of said first pins being coupled to and extending away from said second end corresponding to said first half.

8. A drop cloth retention system comprising:
- a drop cloth being configured to be positioned on a support surface thereby inhibiting the support surface from being contaminated; and
- a clamping unit being configured to be positioned on the support surface, said clamping unit engaging said drop cloth such that said drop cloth is inhibited from moving on the support surface, said clamping unit comprising a first half and a second half, said second half having an upper side, a lower side and a rear side, each of said upper side and said lower side tapering to a point from said rear side such that said second half defines a wedge; and
- a first end corresponding to said second half has a pair of openings extending toward a second end corresponding to said second half, said openings being spaced apart from each other.

9. The system according to claim 8, further comprising a pair of second pins, each of said second pins being coupled to and extending away from said second end corresponding to said second half.

* * * * *